(No Model.)
D. FISHER.
EXPANSION JOINT OR COUPLING FOR PIPES.
No. 328,579. Patented Oct. 20, 1885.
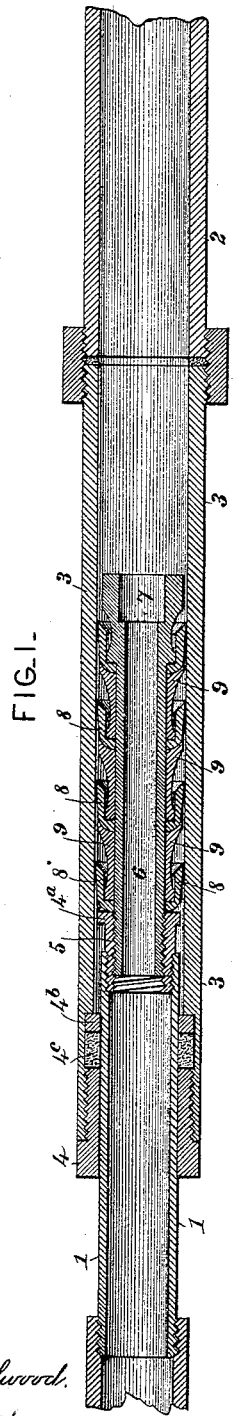
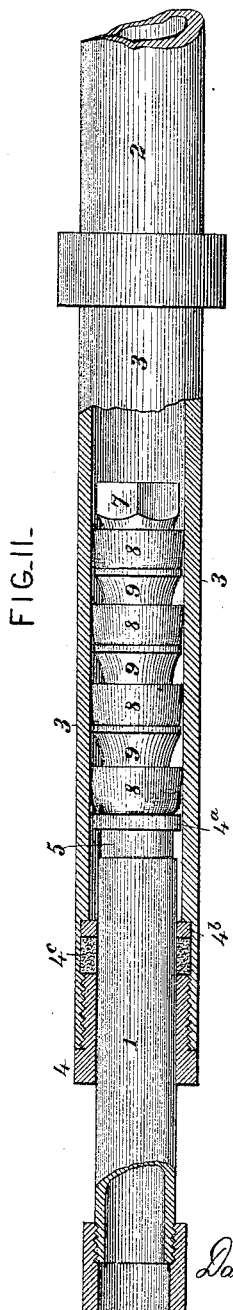
Attest:
Geo. T. Smallwood.
Jas. K. McCathran.
Inventor:
Daniel Fisher,
By Knight Bros
Attys.

UNITED STATES PATENT OFFICE.

DANIEL FISHER, OF OIL CITY, PENNSYLVANIA.

EXPANSION JOINT OR COUPLING FOR PIPES.

SPECIFICATION forming part of Letters Patent No. 328,579, dated October 20, 1885.

Application filed April 14, 1885. Serial No. 162,209. (No model.)

*To all whom it may concern:*

Be it known that I, DANIEL FISHER, a citizen of the United States, residing at Oil City, in the county of Venango and State of Pennsylvania, have invented a new and Improved Expansion Joint or Coupling for Pipes, of which the following is a specification.

The object of my invention is to provide an expansion-joint for steam-lines, gas-lines, oil-lines, and the like, to permit the contraction and expansion of the pipe without leakage or danger of pulling apart. In the present extensive introduction of pipe-lines of great length for conveying gas, steam, or other fluid, sometimes under very heavy pressure, much difficulty has been experienced from the effects of expansion and contraction with joints now in general use.

My improved joint consists, essentially, of a coupling-sleeve inclosing the end of the pipe, and a series of cups thereon formed of leather, rubber, asbestus, or other suitable material, according to the nature, pressure, and temperature of the gas, steam, or other fluid to be conveyed. The coupling-sleeve may be permanently attached to one of the pipe-sections to be coupled, while the other end of the other section slides within it to a sufficient extent to provide for all possible expansion and contraction under variation in temperature. These expansion-joints are provided at the required intervals along the pipe-line, the sleeve in each case being prevented by a coupling-collar from pulling completely off the pipe-section on which it slides, so that while ample facility is provided for expansion and contraction of the entire line, no one of the expansion-joints will be moved to a greater extent than is due to the expansion or contraction of each section between the successive joints. The expansion-cups on the pipe within the sleeve are separated by conical collars, and have their concave faces presented in the direction from which the pressure is received, so that such pressure will force the flexible packing material of which the cups are formed into tight contact with the interior of the coupling-sleeve, forming a gastight joint, while permitting the free movement of the pipe within the sleeve as it expands or contracts under changes of temperature.

In the accompanying drawings, Figure I is a longitudinal section of the improved joint or coupling, and Fig. II is a longitudinal section with the interior parts in elevation.

1 2 represent the meeting ends of two sections of a pipe-line, and 3 the coupling-sleeve by which they are connected. The said coupling-sleeve may be permanently connected in any customary way to the section 2, while the section 1 is permitted to slide within the sleeve through a confining screw cap or collar, 4, engaging with a flange, $4^a$, on the pipe, or on a plug, 5, screwed therein, to prevent the entire separation of the parts. Within the sleeve a washer, $4^b$, may be interposed between the collar 4 and flange $4^a$, and also a packing, $4^c$, if desired; but this is not essential. To the extremity of the pipe-section 1, within the coupling-sleeve, is applied a hollow screw-plug, 5, within which a hollow packing-plug, 6, is screwed; or the said packing-plug 6 may be screwed directly in the pipe-section 1, if preferred. The packing-plug 6 may terminate in a square collar, 7, for screwing it in the end of pipe-section 1 or the plug 5 therein. Upon the packing-plug 6, between the head 7 and the end of the pipe 1, I apply a series of cup-shaped gaskets or packing-collars, 8, of leather, rubber, or other suitable material, with conical expansion sleeves or collars 9 interposed between them, so that by screwing the packing-plug 6 forcibly into the end of the pipe 1, or into the hollow plug 5 therein, the packing-cups 8 may be forced outward. The conical expansion-plugs 9 are so formed as to allow access of the gas, steam, or other fluid contained in the pipes 1 2 3 to the interior of the cups, so that the pressure of the fluid will force the said cups outward into tight contact with the interior of the coupling-sleeve 3, forming a gas-tight joint.

For steam or other fluids of very high temperatures the packing-cups 8 are made of asbestus.

I am aware that expansion-cups are commonly used for packing pump-pistons. A distinguishing feature of my invention consists in the combination of two pipe-sections and an expansible packing to form a tight joint, while permitting relative longitudinal movement between the pipe-sections due to their expansion and contraction.

Having thus described my invention, the following is what I claim as new therein and desire to secure by Letters Patent:

1. The combination of the pipe-sections 1 2, coupling-sleeve 3, and the cup-packings 8, as and for the purposes herein shown and described.

2. The combination of the pipe-sections 1 2, coupling-sleeve 3, hollow packing-plug 6, packing-cups 8, and interposed expansion-plugs 9, as and for the purposes set forth.

DANIEL FISHER.

Witnesses:
W. E. JUDD,
W. H. WISE.